(12) United States Patent
Pham

(10) Patent No.: US 7,916,350 B2
(45) Date of Patent: Mar. 29, 2011

(54) MINIMIZING VISUAL ARTIFACTS IN A BRICK-LAYER HALFTONE STRUCTURE

(75) Inventor: Hung M. Pham, Torrance, CA (US)

(73) Assignee: Xerox Corporation, Norwalk, CT (US)

( * ) Notice: Subject to any disclaimer, the term of this patent is extended or adjusted under 35 U.S.C. 154(b) by 487 days.

(21) Appl. No.: 12/102,929

(22) Filed: Apr. 15, 2008

(65) Prior Publication Data

US 2009/0257073 A1    Oct. 15, 2009

(51) Int. Cl.
*H04N 1/405* (2006.01)
(52) U.S. Cl. ...................... 358/3.05; 358/3.03
(58) Field of Classification Search ............ 358/1.7–1.9, 358/2.1, 3.03–3.09, 3.2, 3.16–3.19
See application file for complete search history.

(56) References Cited

U.S. PATENT DOCUMENTS

| | | | |
|---|---|---|---|
| 4,926,267 A * | 5/1990 | Shu et al. | ..................... 358/3.26 |
| 6,229,555 B1 | 5/2001 | Hadady et al. | |
| 6,850,651 B2 * | 2/2005 | Zaklika et al. | ................ 382/275 |
| 6,917,443 B1 | 7/2005 | Wang | |
| 7,123,282 B2 | 10/2006 | Fields et al. | |

\* cited by examiner

*Primary Examiner* — Thomas D Lee
*Assistant Examiner* — Stephen M Brinich
(74) *Attorney, Agent, or Firm* — Philip E. Blair; Fleit Gibbons Gutman Bongini & Bianco P.L.

(57) ABSTRACT

What is disclosed is a novel system and method for minimizing visual artifacts, such as ROS skew and laserbeam bow, in a brick-layer halftone structure. The present method involves determining a line pattern from ROS skew and laserbeam bow profiles which traverses through successive halftone cells displacing pixels along scanlines in the process direction. The amount of displacement is varied as a function of the cross-process location as determined by the line pattern. Pixels along scanlines are shifted in a direction defined by the error profiles. In each halftone cell within which the line pattern traverses, extra pixels (empty pixel spaces created in the halftone cell by the shifting operation) are filled with lost pixels (pixels bumped from the halftone cell during the shifting operation) such that overall density of the halftone cell is maintained. The lost pixels are buffered such that lost pixels are preserved.

20 Claims, 11 Drawing Sheets

MINIMIZING VISUAL ARTIFACTS IN A BRICK-LAYER HALFTONE STRUCTURE

TECHNICAL FIELD

The present invention is directed to methods for minimizing visual artifacts generated from laser scan process directional errors, such as printhead ROS skew and laserbeam bow, in a brick-layer halftone structure.

BACKGROUND

In order for a multi-color laser printer to accurately reproduce an image, the laser beam, or beams, for each of the four CMYK colors must be aligned in the scan direction (across the page) and in the process direction (feed direction of the paper). Providing proper alignment of the laser printheads relative to the sheet of media in each direction can be difficult. The optical path taken by the laser beams is often offset in a single polygon mirror optical system. As the laser light passes through these optical systems, light can bend or bow as it moves across its scan. This can generate unwanted scan defects often referred to as artifacts.

Reference is now being made to FIG. 9A which is an illustration of an imaginary grid defined with respect to a surface of a photoconductive drum (or belt) of a laser printer commonly found in the arts. Imaginary grid 902 is defined in relation to photoconductive surface 904 of the drum and is intersected by a plurality of rows 906a-e and columns 908a-e. The intersection of each row and column defines a center of a halftone cell (as shown at location 924 of FIG. 9B).

During latent image formation on the photoconductive surface, each of a plurality of pixels is located relative to the center of one of the halftone cells. If a printing system experiences laser scan process directional errors, such ROS skew and laserbeam bow, the actual location or formation of the pixels on the photoconductive surface deviates from the desired location. This is illustrated in FIG. 9B.

As illustrated in FIG. 9B, a plurality of substantially parallel but bowed dashed lines representing a plurality of scanlines 912, 914, 916, 918 and 920 traced by a laser beam across imaginary grid 902 in scan direction 922, which traverses process direction 910. The ROS skew and laserbeam bow is shown exaggerated to illustrate the positioning problems created by laser scan process errors. Thus, the actual locations associated with a halftone, as depicted by the intersection of the scan lines with columns 908a-e, are subsequently offset in the process direction. This offset becomes more pronounced as the laser beam is scanned from left to right across the photoconductive surface in direction 922. The offset error can occur in an upward direction as opposed to the downward direction shown with respect to scan lines 912-920. In order to minimize the effects of the laser scan errors, the positioning of the laser beam is controlled during the scanning of adjacent pairs of scan lines 914 and 916 to offset the position of pixels of a halftone cell. The redefining of the location of pixels in a halftone cell is accomplished by shifting the pixels in the halftone cell relative to the location of the pixels in an adjacent halftone cell.

Reference is now made to FIG. 10. The imaginary grid 902 is overlaid with a plurality of bowed lines, one of which is shown at 912. Scanline A illustrates uncompensated printing along a beam trajectory without any bowing. Scanline B illustrates uncompensated printing along a bowed beam trajectory. Scanline C illustrates a correction of scanline B by a shifting of data by one to many scanline widths to compensate for beam trajectory bowing. Scanline D represents the result of a halftone cell shifting performed according to the method described in U.S. Pat. No. 7,123,282 to Fields et al. (Oct. 17, 2006).

Reference is now being made to FIG. 11 which is an illustration of a halftone pattern in a non-bowed system corresponding to scanline A of FIG. 10 showing the result of a scan without any beam trajectory bow. Multiple halftone cells 1104 are proximately positioned to render a desired color for halftone 1102. Although the halftone cell is shown having a four-by-four matrix of pixels, the halftone cell may be any dimension of three or greater. The pixels of the halftone cell overlay and are selected to be contained in the halftone cell based on the intensity of the color of that portion of the image. Pixels in a halftone cell are selected based upon studies of the human visual system that interpret the intensity of color.

Reference is now being made to FIG. 12 which is a prior art illustration showing pixels of the halftone cells of FIG. 11. The pixels are shifted in direction 1206 along a boundary proximately located along a border of adjacent halftone cells. At boundary 1202, there is a shifting of a column of pixels (and all subsequent pixels in subsequent halftone cells) that result in the generation of white space 1204. One of the things that is desirable to avoid in the use of halftone imaging is white space. White space leads to a condition that creates a visual artifact that may be perceptible by the human eye. Shifting pixels adjacent to a border of a halftone cell while leaving border pixels of the halftone cell un-shifted generates the visual artifact.

Litho-printers commonly start with halftone angles as follows: Yellow at 0°, followed by a 15° rotation for Cyan, Black at 45°, and Magenta at 75°. Alternately, Cyan can be set at 105° (really 15°+90°) and Magenta at 165° (75°+90°). Rotating these angles by 4-8 degrees is an approach that has been used for both screen printers and flexographers.

Halftone dots are drawn on the diagonal, which many feel hides the digital patterns best. There are speed and efficiency advantages to using angles that are easy to calculate. There are also only a few fixed choices, as you cannot move the pixels around on the printer. Rotating a square 90° has no effect. This helps explain why certain halftone angles are better than others. For example, 30° and 15° are two halftone angles that can be efficiently calculated. Since a quarter turn has no effect on a square grid, rotating a square 120° is the same as rotating it 30°.

In order to determine how far you should rotate the angle set, you must consult with your prepress supplier, service bureau, or RIP software manufacturer, who can tell what angles are supported at the halftone line count you are using. The two most common ones are Yellow 5°, Cyan 20°, Black (K) 50°, and Magenta 80° or Yellow 7.5°, Cyan 22.5°, Black 52.5°, and Magenta 82.5°. Contrasting colors can be printed at any of these angles. When the color separations are printed, the rotated angle positions can be verified with a protractor or angle determiner.

Some halftone screens have an angle of 0°, which means that the cell used to construct a halftone is oriented the same way as the dots on the printer. Halftones with this alignment tend to generate noticeable artifacts since the human eye tends to more easily perceive linearly arranged dots. A higher resolution tends to hide this but so does changing the angle. Since the human eye tends to see the linear arrangement of dots, a higher resolution tends to hide this effect but so does changing the angle. Some consider 45° as the best angle to use since the halftone dots are drawn on the diagonal.

On a single screen, spot registration may not be a big problem. However, when four color separations are combined, minute discrepancies can lead to moiré and color shift.

Screen frequency, screen angle, and resolution affect moiré. Bow error affects the screen angle and thus moiré.

Accordingly, what is needed in this art are increasingly sophisticated systems and methods for minimizing visual artifacts generated from laser scan process directional errors in color printing devices, such as printhead skew and laserbeam bow, in a brick-layer halftone structure.

BRIEF SUMMARY

What is provided is a novel system, method, and computer program product for minimizing visual artifacts generated from laser scan process directional errors in color printing devices, such as ROS skew and laserbeam bow, in a bricklayer halftone structure. The present invention targets those halftones angled in the Cyan and Magenta range.

In general, the present method involves determining a line pattern traversing through successive halftone cells in the brick-layer structure displacing pixels along successive scanlines in the process direction. The amount of displacement is varied as a function of the cross-process location as determined by the line pattern. Pixel segments along scanlines are shifted. In each halftone cell within which the line pattern traverses, extra pixels (empty pixel spaces created in the halftone cell by the shifting operation) are filled with lost pixels (pixels bumped from the halftone cell during the shifting operation) such that overall density of the halftone cell is maintained. The lost pixels are buffered such that lost pixels are preserved. Advantageously, by moving the start of the shifting pixel locations, with respect to each subsequent scanline, incrementally towards the center of the halftone cell, the error is shifted to less noticeable places within the cell thus minimizing visual artifacts.

In one example embodiment, an image is scanning having a plurality of halftone cells arranged in a brick-layer structure. Each halftone cell in the brick layer structure generally comprises a plurality of pixels arranged in a M×N rectangle where M≧3 and N≧3. An error profile applicable to the scanned image is determined in one embodiment by the ROS skew and laserbeam bow error. A start pixel location in a first halftone cell is determined by the error profile. The start pixel location can be adjusted to a location between a pixel at a border and a pixel at a center of the first halftone cell. A line pattern through the first halftone cell is then determined. The line pattern begins at the start pixel location and traverses through the first halftone cell in a process direction. The line pattern defines a first number of steps proceeding in a first direction towards a center of the first halftone cell. The line pattern defines a second number of steps in a second direction towards a pixel location at an end border of the first halftone cell. The pixel location at the end border is opposite to location of the start pixel at the start border. The first number of steps in the first direction equals the second number of steps in the second direction. Each successive step in the line pattern defines a start of a pixel shift operation to correct the error. The line patterns can be readily extended through successive halftone cells in the brick-layer structure in the process direction. A second pixel start location along a start border of a second halftone cell is further determined based on the error profile. The second halftone cell is in a fast scan direction along a scanline to the first halftone cell. A second line pattern, starting at a second start pixel location, traverses through the second halftone cell. Then, for each scanline between the first and second halftone cells, pixels along each scanline are shifted in a direction defined by the error profile starting from the first line pattern and ending at the second line pattern.

Since shifting of pixel segments along scanlines creates pixels which are lost (loss pixels) during the shifting operation and generates empty pixel spaces (extra pixels) within any given halftone cell, information about pixels in the first halftone cell lost during the pixel shifting operation are buffered to preserve the pixels. Thereafter, generated empty pixel spaces are filled with preserved pixels such that overall cell density of each halftone cell is maintained.

The foregoing and other features and advantages will be apparent from the following more particular description of the preferred embodiments of the invention, as illustrated in the accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is provided is a system and method for minimizing visual artifacts generated from laser scan process directional errors, such as ROS skew and laserbeam bow, in a brick-layer halftone structure.

It should be understood that one of ordinary skill in this art would be readily familiar with many facets of color science and related mathematical techniques and algorithms commonly found in the color science arts. One of ordinary skill in this art would also be knowledgeable about computer science and software and programming systems and methods sufficient to implement the functionality and capabilities described in detail herein in their own hardware environment without undue experimentation.

In general, the present method involves determining a line pattern traversing through successive halftone cells in the brick-layer structure displacing pixels along scanlines in the process direction. The amount of displacement is varied as a function of the cross-process location as determined by the line pattern. Pixels along scanlines are shifted in a direction defined by the error profiles. In each halftone cell within which the line pattern traverses, extra pixels (empty pixel spaces created in the halftone cell by the shifting operation) are filled with lost pixels (pixels bumped from the halftone cell during the shifting operation) such that overall density of the halftone cell is maintained. The lost pixels are buffered such that these pixels are preserved.

Figure 1:
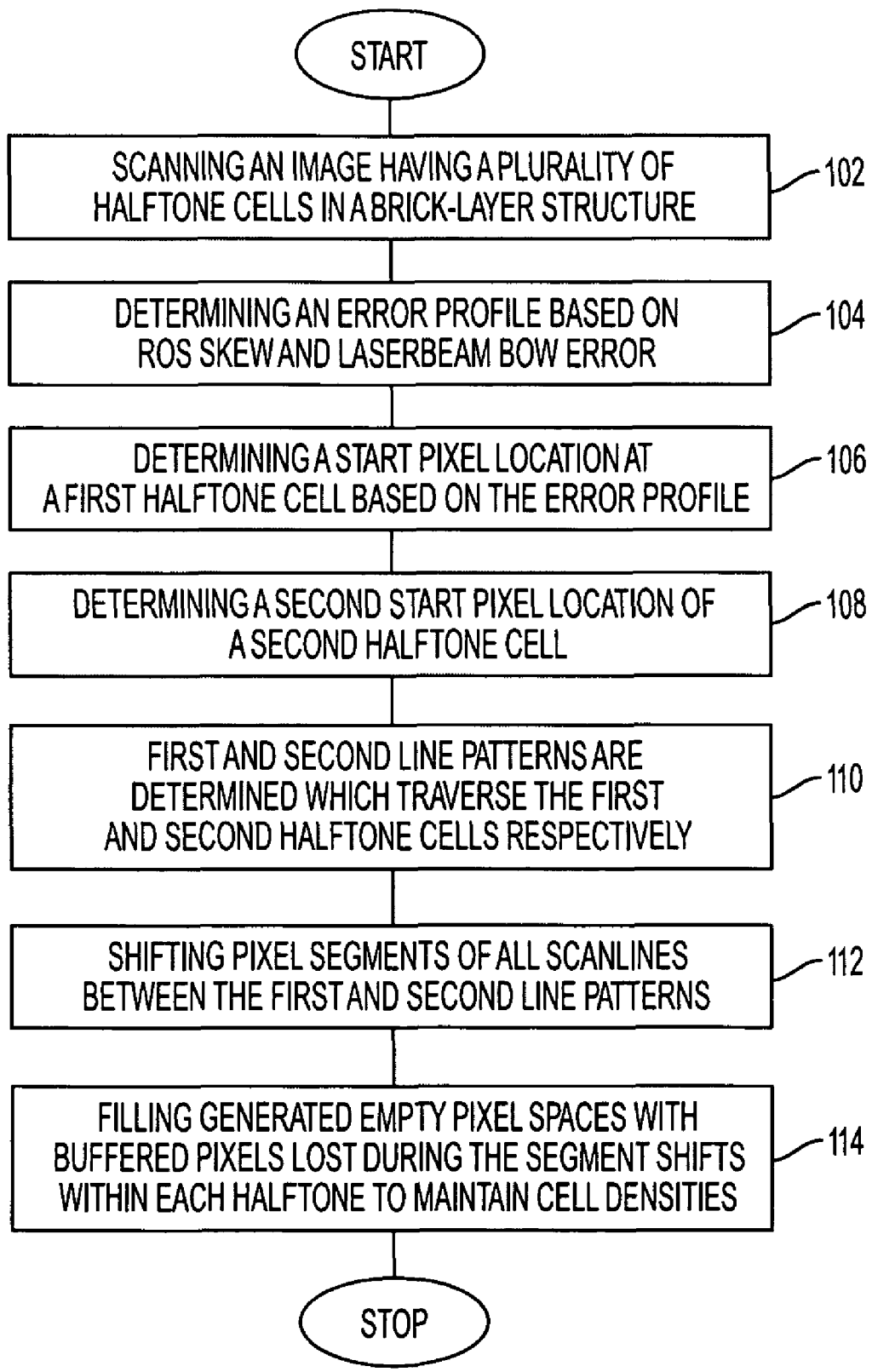
FIG. 1 is a flow diagram of one embodiment of the present method for minimizing visual artifacts in a halftone bricklayer structure.

Reference is now being made to the flow diagram of FIG. 1 which illustrates one embodiment of the present method for minimizing visual artifacts.

In one example embodiment, the present method for minimizing visual artifacts caused by ROS bow and skew error in an image reproduction system involves the following.

At step 102, scanning an image to having a plurality of halftone cells arranged in a brick-layer structure. Each halftone cell in the brick layer structure generally comprises a plurality of pixels arranged in a M×N rectangle where $M \geq 3$ and $N \geq 3$.

At step 104, an error profile applicable to the scanned image is determined from ROS skew and laserbeam bow error. The error profile is measure by sensors common to this art. The error profiles need to be quantized and translated. The quantization and translation of error profiles is well known in this art and thus not described herein further. This produces a series of start locations in the fast scan direction. These start locations are where the pixel shifting operation needs to be performed in order to compensate for the error(s). For line art images the start locations can remain fixed. For halftone images, these locations vary such that they are positioned away from halftone borders. Otherwise, artifacts are likely to arise at halftone border locations in a manner similar to that described in the background section hereof.

Figure 3:
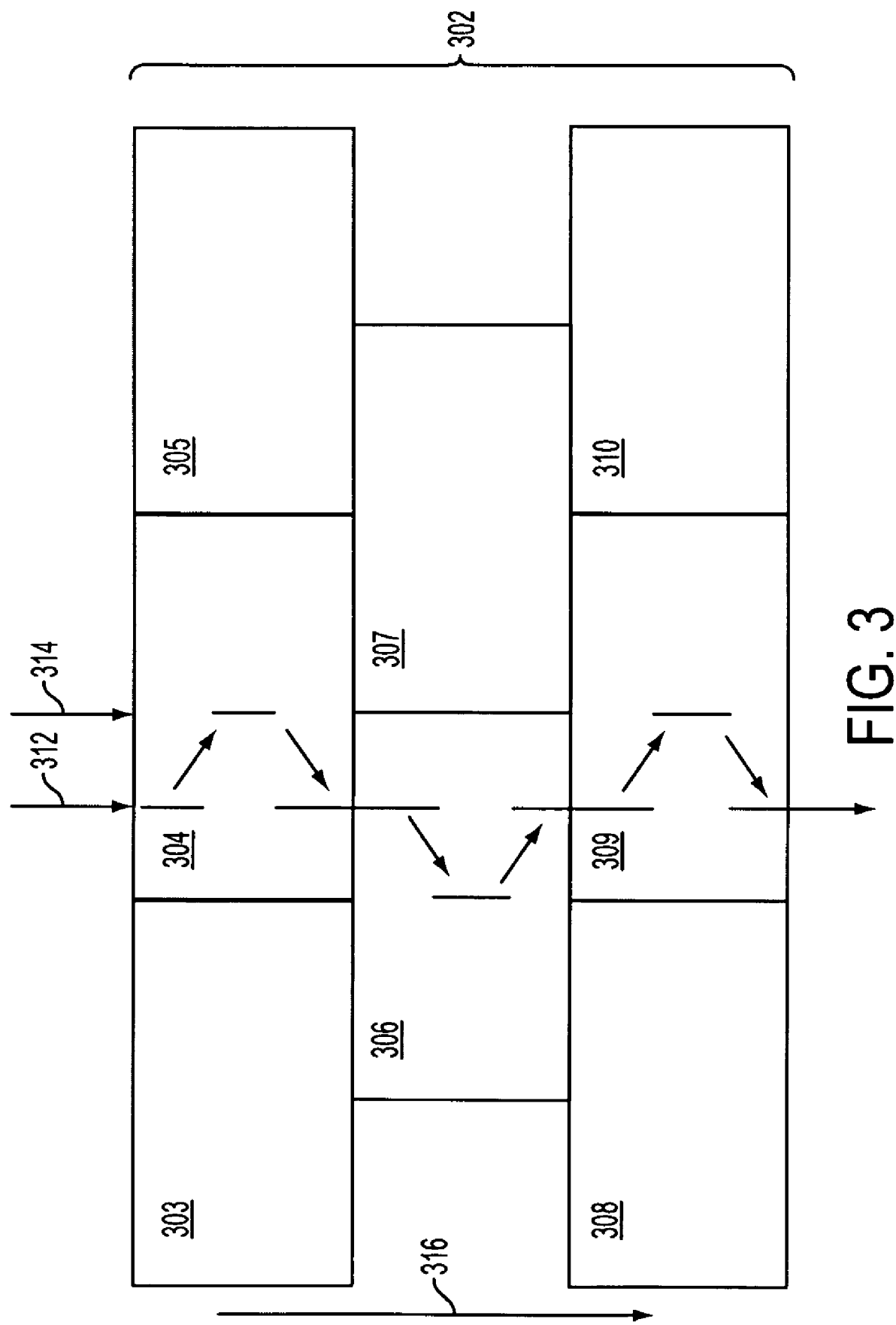
FIG. 3 illustrates a plurality of halftone cells arranged in a brick-layer structure.

At step 106, a start pixel location at a first halftone cell is determined by the error profile. At step 108, a second start pixel location along a border of a second halftone cell is determined from the error profile. The second halftone cell is along scanlines in the fast scan direction (as shown in FIG. 3). The start pixel locations can be adjusted to a location between a pixel at a border and a pixel at a center of the first halftone cell.

At step 110, first and second line patterns are determined for the first and second halftone cells. The first line pattern traverses through the first halftone cell in a process direction beginning at a start pixel location. The first line pattern proceeds in a pattern which defines a first number of steps (in a jagged stair-step) proceeding in a first direction towards a center of the first halftone cell. The first line pattern further defines a second number of steps in a second direction towards a pixel location at an end border of the first halftone cell. The first direction being in a direction opposite to the first direction. Since the end pixel location at the end border is opposite to the location of the start pixel at the start border, the first number of steps in the first direction equals the second number of steps in the second direction. Each successive step in the first line pattern defines a start of a pixel shift operation.

The first line pattern extends through successive halftone cells in the brick-layer structure in the process direction. The second line pattern, starting at the second start pixel location, traverses through the second halftone cell. The second line pattern is determined in a manner which is substantially similar to the first line pattern. The second line pattern also extends through successive halftone cells in the brick-layer structure in the process direction (as shown in the halftone structure of FIG. 3).

At step 112, pixel segments are shifted along each scanline between the first and second line patterns to minimize visual artifacts. Pixels are also shifted along each scanline starting from the second line pattern to a third line pattern (not shown), and from the third line pattern to a fourth line pattern (not shown), etc. It should be understood that there are a plurality of start locations determined by the error profiles which define the start of line patterns extending through various halftone cells in the process direction throughout the image.

Since shifting of pixels along scanlines creates pixels which are lost during the shifting (loss pixels) and since an equal number of empty pixel spaces are generated (extra pixels), at step 114, information about pixels lost during shifting of the pixel segments between the first and second scan lines in any given halftone cell are buffered. Generated empty pixel spaces within any given halftone cell are filled with the lost pixels from that same halftone cell such that overall cell density of each halftone cell is maintained. Empty pixel spaces are created by the downward pixel shifting operation as discussed herein further with respect to FIG. 6.

It should be understood that the flow diagrams depicted herein are illustrative. For example, one or more of the operations illustrated in any of the flow diagrams may be performed in a differing order. Other operations, for example, may be added, modified, enhanced, condensed, integrated, or consolidated. Variations thereof are envisioned and are intended to fall within the scope of the appended claims.

Figure 2:
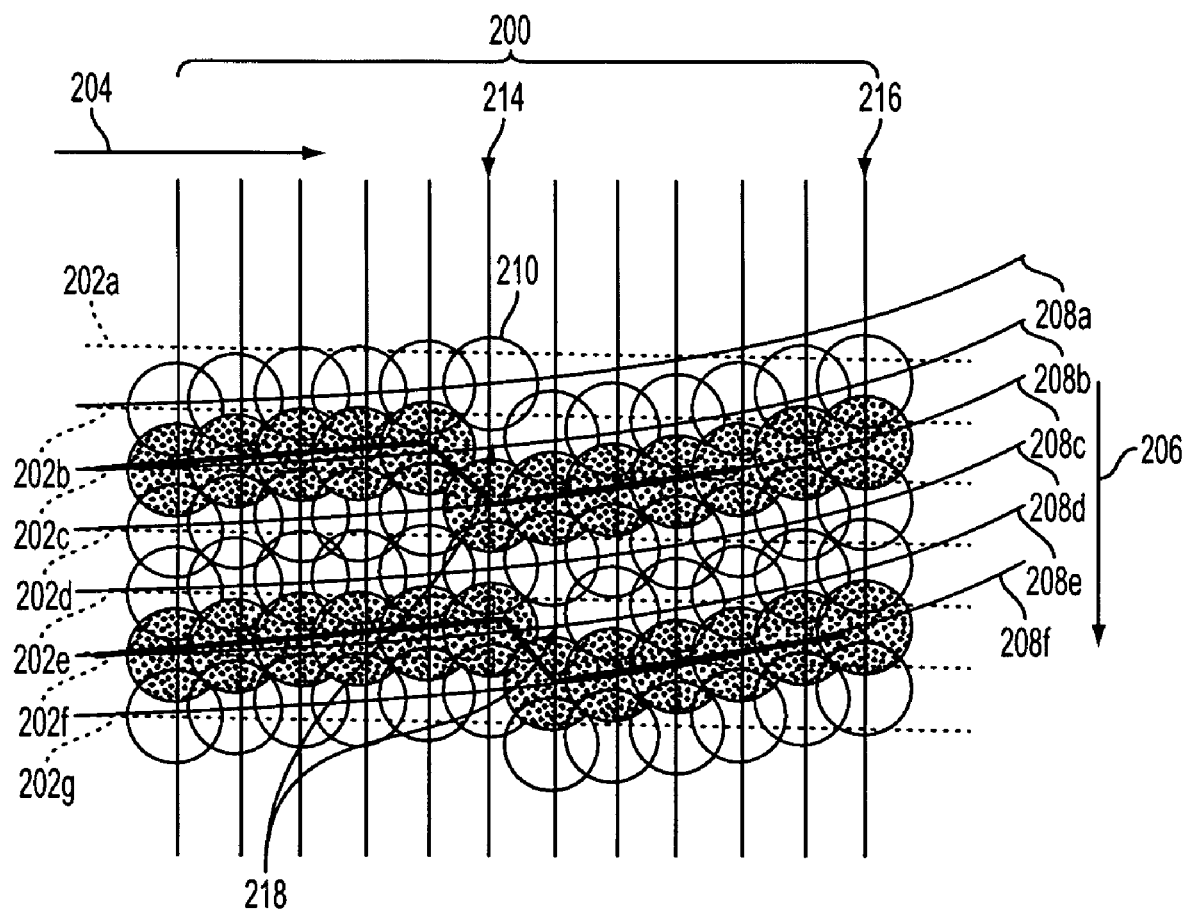
FIG. 2 illustrates how empty pixel spaces are generated during a pixel shifting operation.

Reference is now being made to FIG. 2 which illustrates empty pixel spaces generated during a pixel shifting operation. Imaginary grid 200 is overlaid with dashed lines 202a-g representing a plurality of scanlines traced by a laser beam in the scan direction 204 which traverses the process direction 206.

In the illustration shown, the beam trajectory bow is represented by bowed lines 208a-f, shown exaggerated. Plurality of pixels (individually represented by pixel 210), are shifted in the process direction starting at start location 214 determined by the profile error which, in this case, indicated that a pixel correction shift is required at this starting location. Another correction, yet to be performed, is also required at start location 216. Further down along imaginary grid 200 in the scan direction 204, additional corrections will also be required as the pixels along the beam trajectory bow begin to skew substantially off their corresponding dashed scanline. Notice that the shifting of the pixels starting at the start location leaves empty pixel spaces (or voids) 218. Since the grid was originally filled with pixels, other pixels, not shown, were necessarily bumped (or lost) in order for these empty spaces to have arisen. According to the present method, the lost "bumped" pixels were preserved such that these can be used herein to "patch" or fill empty pixel spaces 218 to maintain halftone cell densities. Pixels can be preserved in a variety of methods depending on the specific hardware/software implementation.

One of ordinary skill in this art would appreciate that a FIFO or LIFO stack, commonly found in the arts, can be readily utilized as a buffering mechanism within which lost pixels (and other related information) can be stored for later use to fill empty pixel spaces generated as a result of the pixel segment shifting operation within a given halftone cell. Various software data structures can also be implemented as a buffering mechanism. Other buffering mechanisms, such as memory or storage, can also be utilized as a buffering mechanism depending on the image reproduction environment within which the present method finds its intended uses.

Reference is now being made to FIG. 3 which illustrates a plurality of halftone cells 303-310 arranged in brick-layer structure 302. It should be understood that each of the halftone cells in the illustrated brick-layer structure comprises a plurality of pixels arranged in a M×N rectangle where $M \geq 3$ and $N \geq 3$ and $M \neq N$. For the designer of the image reproduction device, the structure of the halftone cells and the arrangement of the pixels contained therein, are known.

As previously mentioned, the ROS skew and laserbeam bow error profiles define a plurality of start locations where the pixel shifting operation is to be performed. The original start location 314 has been shifted to new start location 312. The original start location is adjusted away from near the center of halftone cell 304 to a new location nearer to the border between halftone cell 303 and halftone cell 304. The line pattern of the present method to minimize artifacts follows a stepped pattern which proceeds in a direction towards the center of the halftone from the start location and then moves in an opposite direction to return to an end pixel location at an opposite border of halftone cell 304 which mirrors start location 312. This end location of the line pattern through halftone cell 304 becomes the start location of the line pattern though halftone cell 306. The number of steps the line pattern makes moving from the start location 312 towards the center of halftone cell 304 equals the number of steps the line pattern makes moving in the opposite direction towards the end location of halftone cell 304.

In a similar manner, the line pattern proceeds, in a stepped manner, to traverse halftone cell 306 moving first towards a center of halftone cell 306 and then moving in an opposite direction in an equal number of steps toward the end location of halftone cell 306. Again, the number of steps the line pattern made moving towards the center of halftone cell 306 equals the number of steps the line pattern makes moving to the end location of halftone cell 306. The end location of the line pattern in halftone cell 306 becomes the start location of the line pattern through halftone cell 309. The line pattern repeats in the manner described as it traverses through the rest of the halftone cells encountered in process direction 316.

Figure 4:
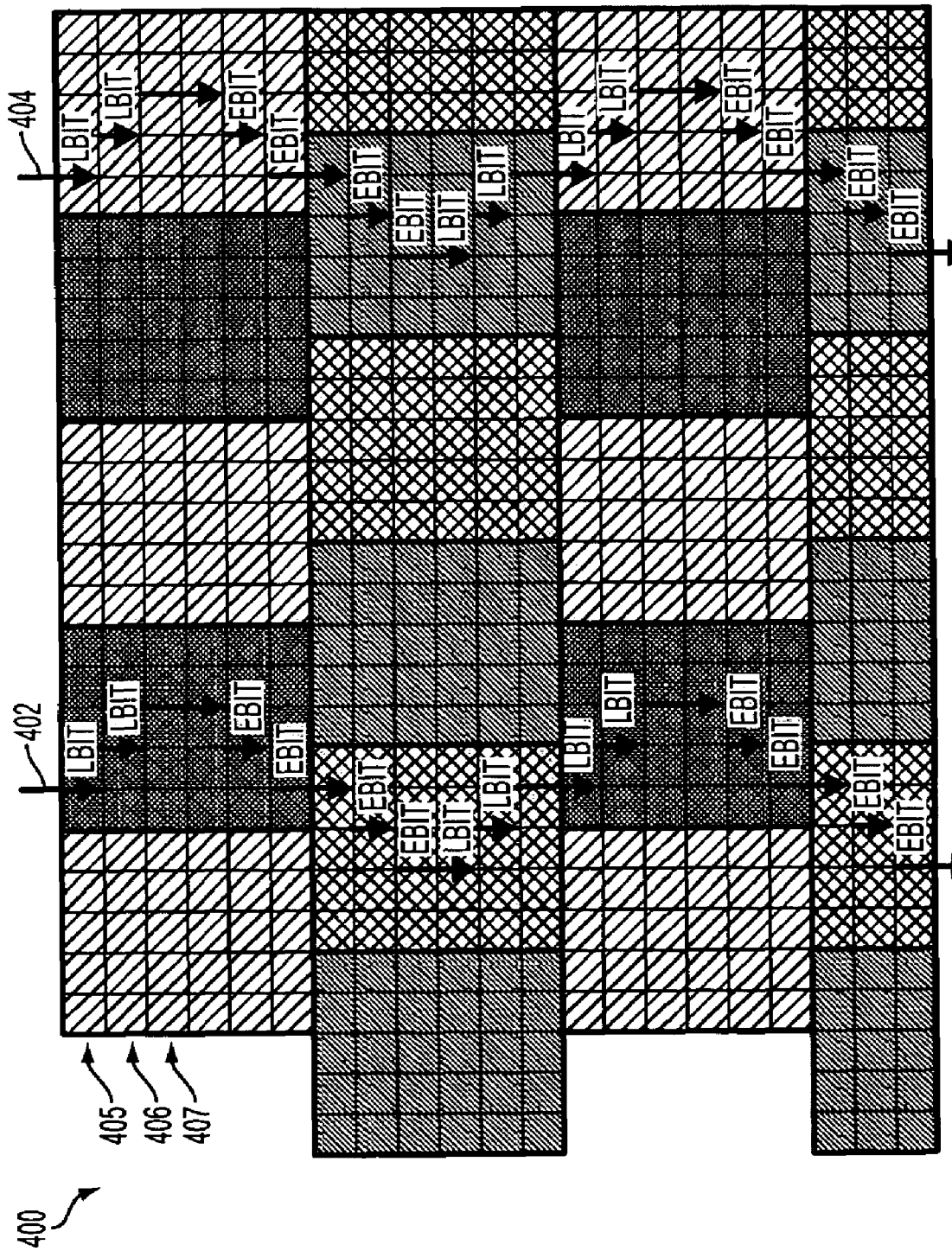
FIG. 4 shows one embodiment of a brick-layer halftone structure wherein two line patterns traverse their respective halftone cells in the manner shown in FIG. 3.

Reference is now being made to FIG. 4 showing one embodiment of a brick-layer halftone structure 400 wherein two line patterns (402 and 404) traverse their respective halftone cells.

As previously discussed, the brick-layer halftone structure comprises a plurality of pixels arrange in an M×N rectangle having rows and columns. Each row of pixels is arranged in scanlines, shown at 405-407, in the process direction. For clarity, only a few of the scanlines at the top of the brick-layer structure have been numbered.

As the line pattern 402 traverses the halftone cells, it moves from the start location towards the center of the halftone cell in a stepped fashion and then moves in the opposite direction in an equal number of steps to the end location. The end pixel location of the line pattern as it exits a halftone cell mirrors the start pixel location of the line pattern where it entered that halftone cell. The end location of one halftone cell becomes the start location of the line pattern of the next halftone cell it traverses. The line pattern repeats as it traverses subsequent halftone cells through the brick-layer structure.

It should be understood that although the two line patterns are shown traversing their respective halftone cells in a similar pattern, the patterns the individual line patterns follow throughout the brick-layer halftone structure can be different in the course they follow as they step their way towards the center of their respective halftone cells and step their way back to the end location of that halftone cell.

The start of line pattern 402 defines the start of the pixel shifting operation of all pixels between line pattern 402 and line pattern 404. The pixel shifting operation is defined by the direction of the beam trajectory bow in the error profile (upward/downward). The pixels along in a single scanline between the two line patterns are referred to herein as a pixel segment or a segment of pixels. The start of line pattern 404 defines the start of a new pixel shifting operation for the pixel segment between line pattern 404 and yet another line pattern (not shown) or to the end of the last halftone cell in the brick-layer structure.

As the pixel shifting operation adjusts the pixel segment along the scanline between the two line patterns, certain pixels near the line pattern are lost (or bumped) during the shift. These lost pixels are labeled as Lbits. The lost pixels are preserved. Certain other pixels near the line pattern are gained (empty pixels) during the shift. These extra pixels are labeled as Ebits. These pixels are filled by the preserved lost pixels. In the embodiment shown, when the shift moves to the right, one pixel is lost and when the shift moves to the left, an empty pixel space is generated.

Since the number of steps in a line pattern as it moves towards the center of any given halftone cell equals the number of steps the line pattern makes in the opposite direction as it moves away from the center of the halftone cell towards the end location of the halftone cell, the number of Lbits will equal the number of Ebits within that cell. Thus, when the lost pixel bits are used to fill the extra pixel bits there is no loss of information within the cell. In such a manner, overall halftone cell density is maintained.

Figure 5:
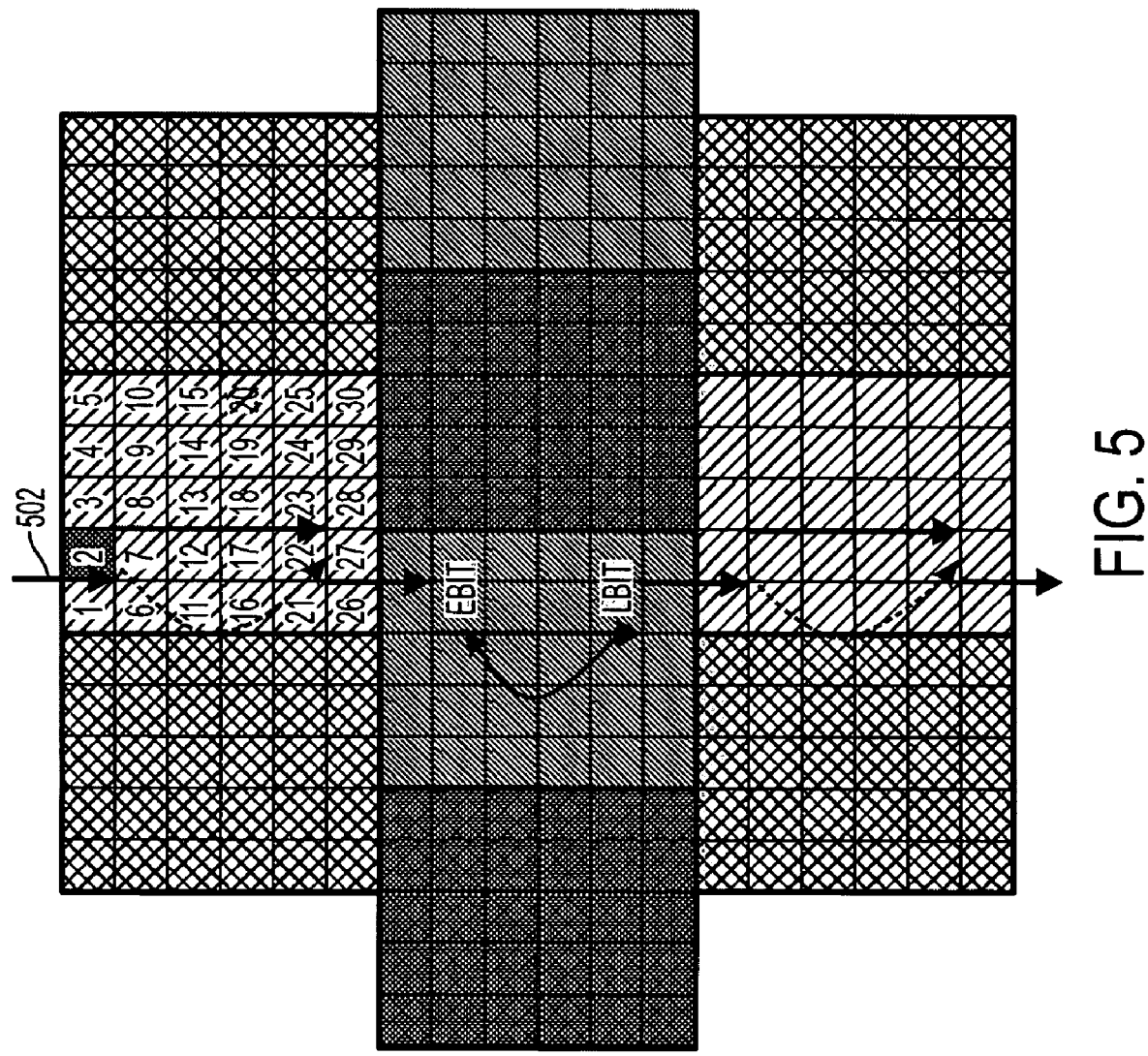
FIG. 5 illustrates a brick-layer halftone structure with a line pattern traversing halftone cells.
Figure 6:
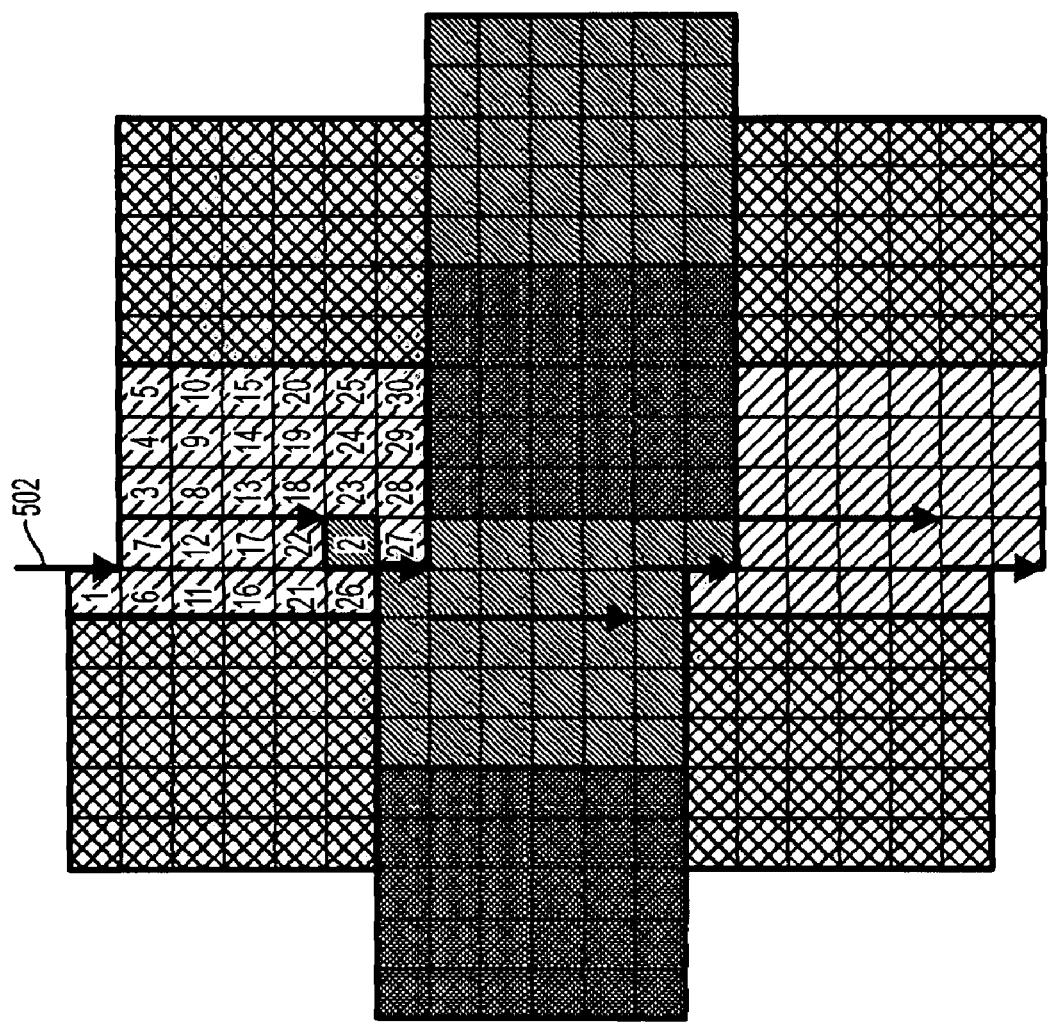
FIG. 6 illustrates the brick-layer halftone structure of FIG. 6 after the shifting of the pixel segments along the scanlines.

Reference is now being made to FIGS. 5 and 6 which together illustrate one example of the shifting of pixel segments in a brick-layer halftone structure. Line pattern 502 traverses the halftone cells in the brick-layer structure in a manner as previously described herein. The individual cells are shown sequentially numbered for visual identification purposes. When the first scanline is shifted downward, pixel (2) of the halftone structure will be bumped (or lost). A space will be created in the slot presently occupied by pixel (27). As shown in FIG. 6, all the pixel segments of all the scanlines to the right of the line pattern 502 have been shifted downward. The pixel space previously occupied by pixel (27) of FIG. 5 is now an empty space as a result of the pixel shifting operation. The preserved lost pixel (2) is used to fill the empty pixel space generated. Overall cell density of the halftone cell has been preserved.

It should be understood that the present method described herein can be implemented on a special purpose computer, a micro-processor or micro-controller, an ASIC or other integrated circuit, a DSP, an electronic circuit such as a discrete element circuit, a programmable device such as a PLD, PLA, FPGA, PAL, PDA, and the like. In general, any device capable of implementing a finite state machine that is in turn capable of implementing one or more elements of the flow diagrams provided herewith, or portions thereof, can be used. Portions of the flow diagrams may also be implemented partially or fully in hardware in conjunction with machine executable instructions.

Furthermore, the flow diagrams hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs, or from a server.

Figure 7:
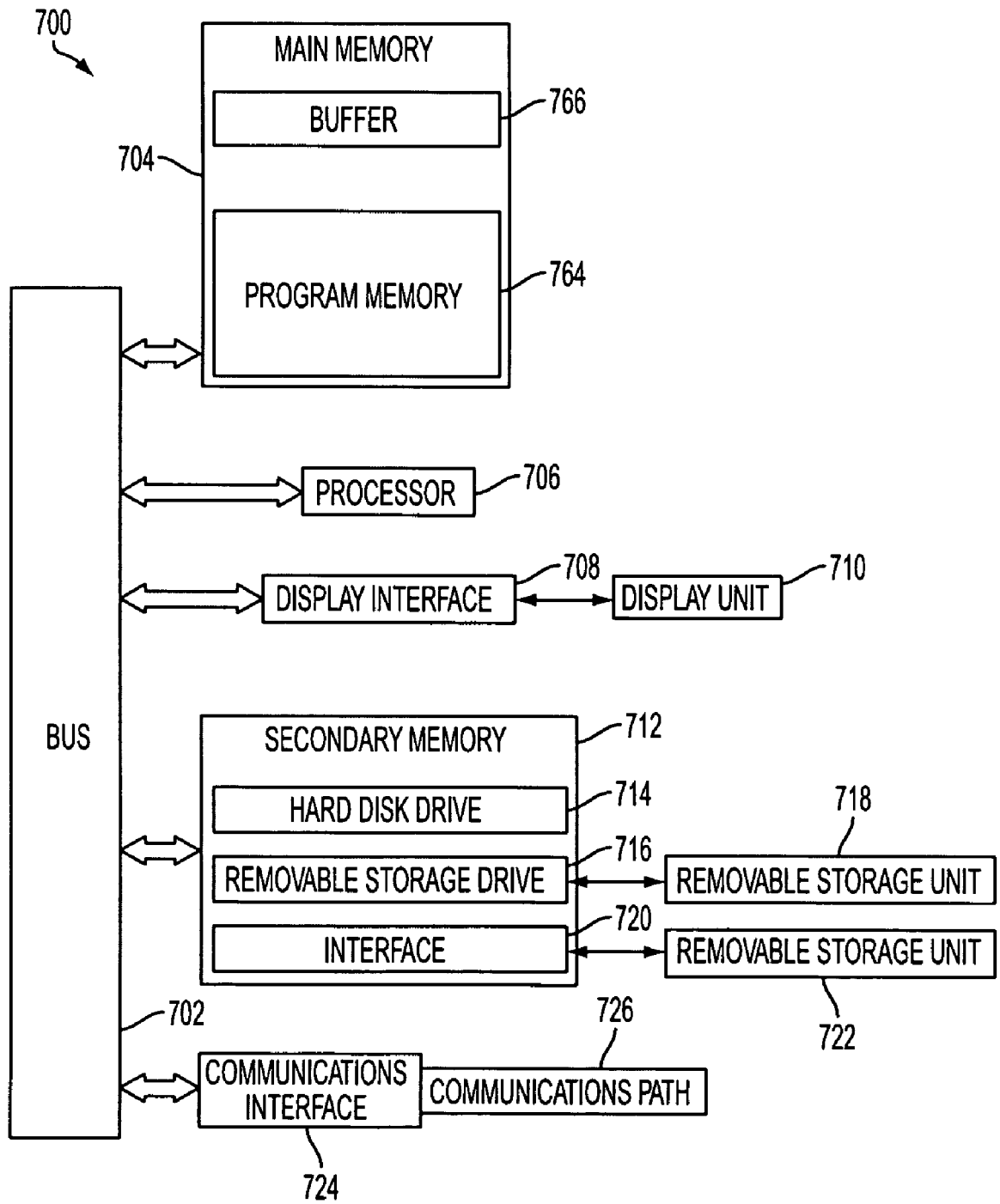
FIG. 7 is a block diagram of one embodiment of a computer system useful for implementing the method illustrated in the flow diagram of FIG. 1.

Reference is now being made the system of FIG. 7 which is a block diagram of one embodiment of a computer system useful for implementing the present method.

The computer system 700 can be a xerographic system, a photocopier, or printing device. The computer system includes one or more processors, such as processor 706 capable of executing machine executable program instructions. In the embodiment shown, the processor is in communication with bus 702 (e.g., a backplane interface bus, crossover bar, or data network). The computer system also includes a main memory 704 that is used to store machine readable instructions to be executed by the processor. The main memory is capable of storing data used by or produced by the processor. The main memory may alternatively include random access memory (RAM) to support reprogramming and flexible data storage.

In the embodiment shown, main memory includes buffer 766 to temporarily store data for access by the processor, and a program memory 764 that includes, for example, executable programs that implement the methods described herein. The program memory is capable of storing a subset of the data that is less than all of the data contained in the buffer.

Computer system 700 includes a display interface 708 that forwards data from communication bus 702 (or from a frame buffer not shown) to display 710. The computer system also includes a secondary memory 712. The secondary memory may include, for example, a hard disk drive 714 and/or a removable storage drive 716 which reads and writes to removable storage unit 718, such as a floppy disk, magnetic tape, optical disk, etc., that stores computer software and/or data.

In an alternative embodiment, the secondary memory 712 includes other similar mechanisms for allowing computer programs or other instructions to be loaded into the computer system. Such mechanisms may include, for example, a removable storage unit 722 adapted to exchange data through interface 720. Examples of such mechanisms include a program cartridge and cartridge interface (such as that found in video game devices), a removable memory chip (such as an EPROM, or PROM) and associated socket, and other removable storage units and interfaces 720 which allow software and data to be transferred from the removable storage unit to the computer system.

The computer system 700 includes a communications interface 724 which acts as both an input and an output to allow software and data to be transferred between the computer system and external devices. Examples of a communications interface include a modem, a network interface (such as an Ethernet card), a communications port, a PCMCIA slot and card, etc.

Software and data transferred via the communications interface are in the form of signals which may be, for example, electronic, electromagnetic, optical, or other signals capable of being received by communications interface 724. These signals are provided to communications interface via a communications path (i.e., channel) 726 which carries signals and may be implemented using wire, cable, fiber optic, phone line, cellular link, RF, or other communications channels.

Terms such as, computer program medium, computer executable medium, computer usable medium, and computer readable medium, are used herein to generally refer to media such as main memory 704 and secondary memory 712, removable storage drive 716, a hard disk installed in hard disk drive 714, and signals. These computer program products are means for providing instructions and/or data to the computer system. The computer readable medium stores data, instructions, messages packets, or other machine readable information. The computer readable medium, for example, may include non-volatile memory, such as a floppy, ROM, flash memory, disk memory, CD-ROM, and other permanent storage useful, for example, for transporting information, such as data and computer instructions. Furthermore, the computer readable medium may comprise computer readable information in a transitory state medium such as a network link and/or a network interface, including a wired network or a wireless network, which allows a computer to read such computer readable information. Computer programs (also called computer control logic) may be stored in main memory and/or secondary memory. Computer programs may also be received via a communications interface. Such computer programs, when executed, enable the computer system to perform the features and capabilities provided herein.

Figure 8:
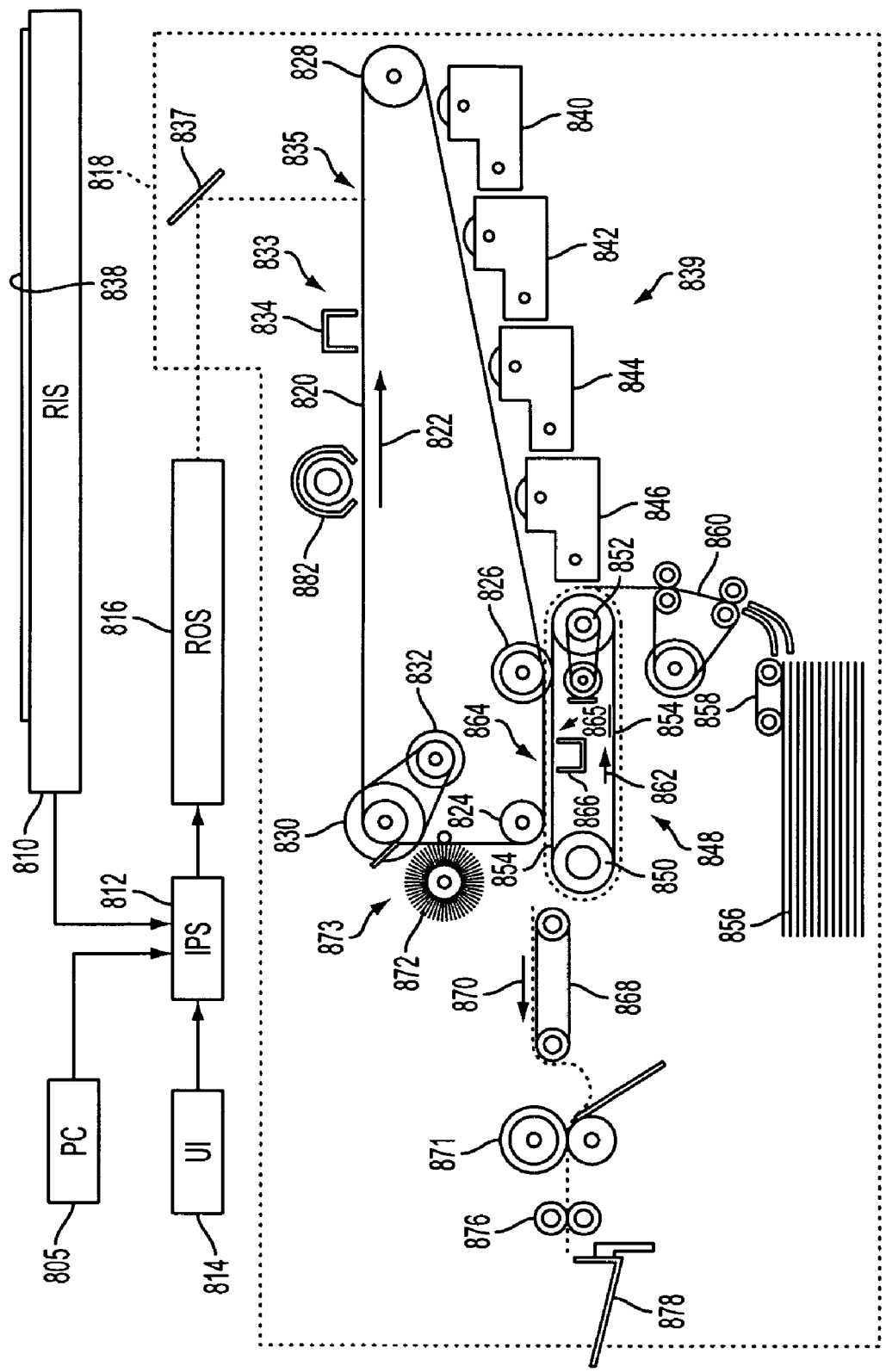
FIG. 8 is a prior art illustration of a schematic elevational view of a color xerographic machine wherein features of the present invention are likely to be incorporated.
Figure 9A:
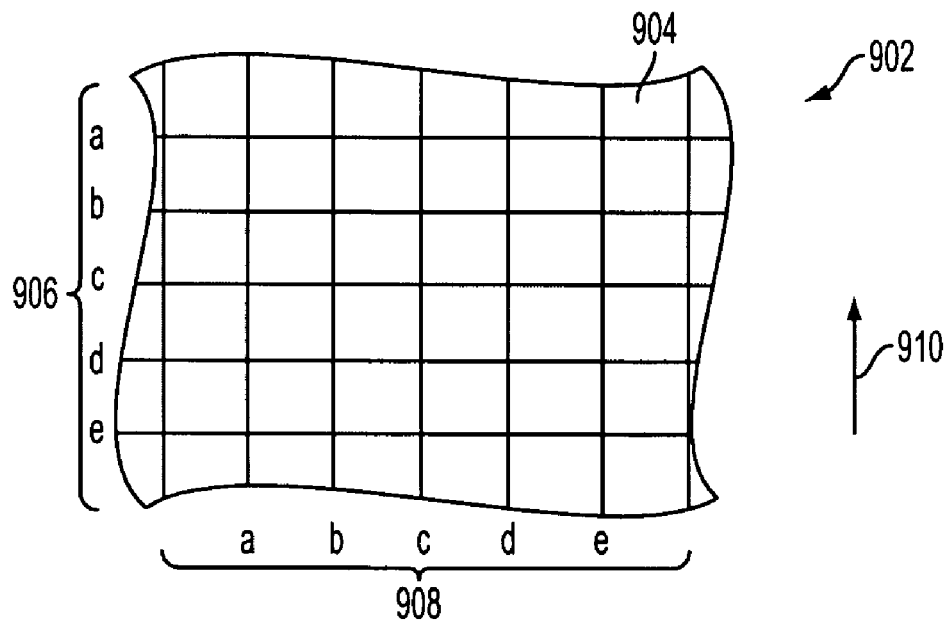
FIG. 9A is a prior art illustration of an imaginary grid defined with respect to a photoconductive surface of a photoconductive drum (or belt) of a laser printer common in the arts.
Figure 9B:
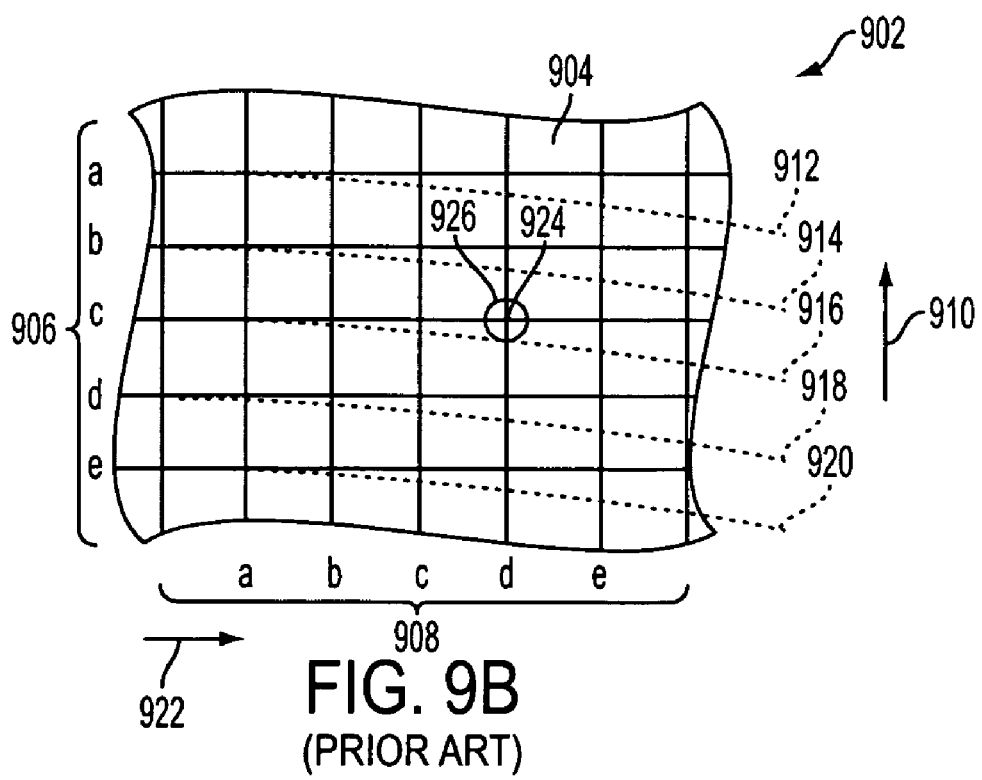
FIG. 9B is a prior art illustration of the imaginary grid of FIG. 9A overlaid with a plurality of substantially parallel but bowed scan lines traced by a laser beam in a process direction.
Figure 10:
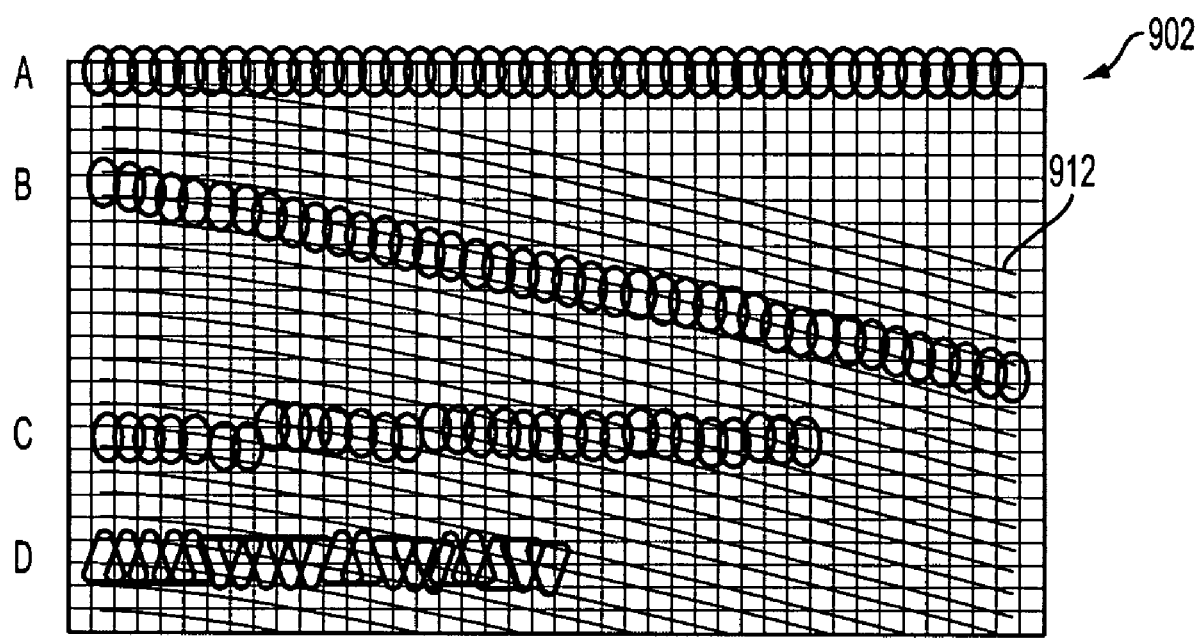
FIG. 10, is a prior art illustration of a desired printing result, an uncorrected printing result, a single-scan compensation, and a halftone cell compensation.
Figure 11:
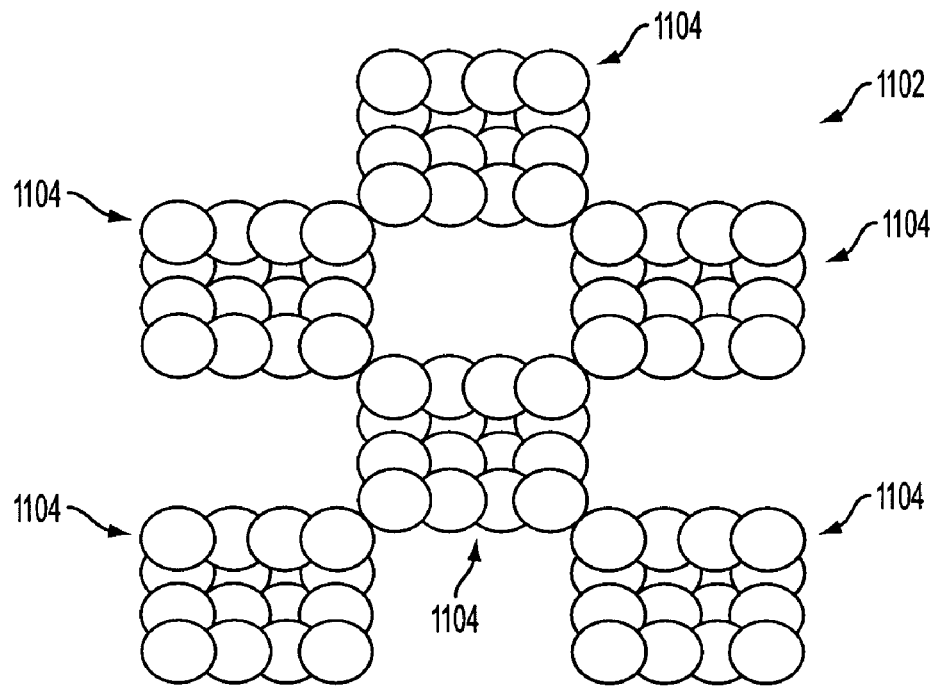
FIG. 11 is a prior art illustration of a halftone pattern in a non-bowed system corresponding scan A of FIG. 10 showing the result of a perfect scan without any beam trajectory bowing.
Figure 12:
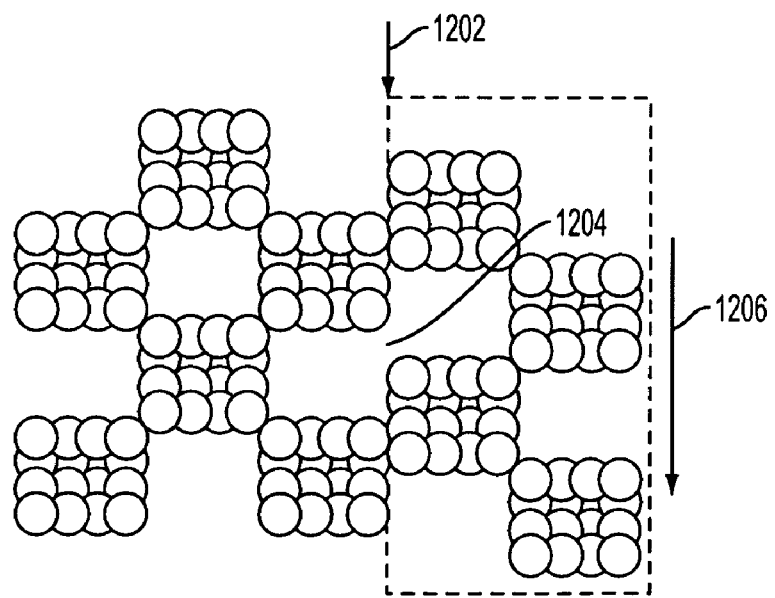
FIG. 12 is a prior art illustration showing pixels of the halftone cell of FIG. 11 shifted along a boundary proximately located along a border of adjacent halftone cells to produce a white space which may cause a perceptible visual artifact.

Reference is now being made to FIG. 8 illustrating a schematic elevational view of a color xerographic printing/copying machine and networked PC known in the arts wherein the present invention is likely to be incorporated. It will become evident from the following discussion that the present method is equally well suited for use in a wide variety of scanning, printing, copying, and other document reproduction systems, and therefore is not limited in application to the particular system(s) shown and described herein.

An Electronic SubSystem (ESS) or Image Processing Station (both referred to as IPS), show generally at 812, contains data processing and control electronics which prepare and manage the image data flow to a raster output scanner (ROS), shown generally at 816. A network of one or more personal computers (PC), shown generally at 805, is shown in communication with IPS 812.

A user interface (UI), shown generally at 814, is also in communication with IPS 812. The user interface enables an operator to control and monitor various operator adjustable functions and maintenance activities. The operator actuates the appropriate keys of the user interface to adjust the parameters of the copy. The user interface may be a touch screen or any other suitable control panel providing an operator interface with the system. The output signal from the user interface is transmitted to IPS 812. The user interface may also display electronic documents on a display screen (not shown), as well as carry out the image rendering selections in accordance with the present invention as described below.

A multiple color original document 838 may be positioned on (optional) raster input scanner (RIS), shown generally at 810. The raster input scanner contains document illumination lamps, optics, a mechanical scanning drive, and a charge coupled device (CCD array) or full width color scanning array. The raster input scanner captures the entire image from original document and converts it to a series of raster scan lines and moreover measures a set of primary color densities, i.e., red, green and blue densities, at each point of the original document. The raster input scanner may provide data on the scanned image to IPS 812, indirectly to personal computer (PC) 805 and/or directly to PC 805.

Documents in digital or other forms may be created, screened, modified, stored and/or otherwise processed by PC 805 prior to transmission/relay to IPS 812 for printing on printer or marking engine 818. The display of the PC may show electronic documents on a screen (not shown). IPS 812 may include processors and controllers (not shown) which perform aspects of image rendering, and also may transmit signals corresponding to the desired electronic or scanned image to the ROS controller 816, which creates the output copy image.

The ROS controller includes a laser with rotating polygon mirror blocks. The ROS illuminates, via mirror 837, the charged portion of a photoconductive belt 820 of a marking engine at a rate of about 400 pixels per inch to achieve a set of subtractive primary latent images. Other implementations may include other pixel resolutions of varying types 600×600 dpi, or even asymmetrical resolutions, such as 400×1200 dpi.

The ROS controller will expose the photoconductive belt to record three or four latent images which correspond to the signals transmitted from IPS 812. One latent image is developed with cyan developer material. Another latent image is developed with magenta developer material and the third latent image is developed with yellow developer material. A black latent image may be developed in lieu of or in addition to other (colored) latent images. These developed images are transferred to a copy sheet in superimposed registration with one another to form a multicolored image on the copy sheet. This multicolored image is then fused to the copy sheet forming a color copy.

With continued reference to FIG. 8, printer or marking engine 818 is an electro-photographic printing machine. Photoconductive belt 820 (or drum) of the marking engine is preferably made from a photoconductive material. The photoconductive belt moves in the direction of arrow 822 to advance successive portions of the photoconductive surface sequentially through the various processing stations disposed about the path of movement thereof.

The photoconductive belt is entrained about rollers 824 and 826, tensioning roller 828, and drive roller 830 rotated by motor 832 coupled thereto by suitable means such as a belt drive. As the drive roller rotates, it advances the photoconductive belt in the direction of arrow 822.

Initially, a portion of the photoconductive belt passes through a charging station, shown generally at 833 wherein a corona generating device 834 charges the photoconductive belt 820 to a relatively high, substantially uniform potential. The charged photoconductive surface of the photoconductive belt is rotated to an exposure station, shown generally at 835, which receives a modulated light beam corresponding to information derived by RIS 810 having multicolored original document 838 positioned thereon. The modulated laser light beam impinges on the surface of the photoconductive belt and illuminates the charged portion of the photoconductive belt to form an electrostatic latent image. The photoconductive belt may be exposed three or four times to record three or four latent images.

After the electrostatic latent images have been recorded on the photoconductive belt, the belt advances such latent images to a development station, shown generally at 839, which includes, in the embodiment shown, four individual developer units 840, 842, 844, 846. The developer units are of a type generally referred to as magnetic brush development units. Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material. Development is achieved by bringing the brush of developer material into contact with the photoconductive surface. Developer units 840, 842, and 844 apply toner particles of a specific color which corresponds to the complement of the specific color separated electrostatic latent image recorded on the photoconductive surface. The color of each of the toner particles is adapted to absorb light within a preselected spectral region of the electromagnetic wave spectrum.

For example, an electrostatic latent image formed by discharging the portions of charge on the photoconductive belt corresponding to the green regions of the original document will record the red and blue portions as areas of relatively high charge density on the photoconductive belt, while the green areas will be reduced to a voltage level ineffective for development. The charged areas are then made visible by having developer unit 840 apply green absorbing (magenta) toner particles onto the electrostatic latent image recorded on the photoconductive belt. Similarly, a blue separation is developed by developer unit 842 with blue absorbing (yellow) toner particles, while the red separation is developed by developer unit 844 with red absorbing (cyan) toner particles. Developer unit 846 contains black toner particles and may be used to develop the electrostatic latent image formed from a black and white original document. Each of the developer units is moved into and out of an operative position wherein the magnetic brush is substantially adjacent the photoconductive belt. While in the non-operative position, the magnetic brush is spaced therefrom. During development of each electrostatic latent image, only one developer unit is in the operative position. The remaining developer units are in the non-operative position.

After development, the toner image is moved to a transfer station, shown generally at 865, which includes a transfer zone, shown generally at 864, wherein the toner image is transferred to a sheet of support material, such as plain paper, amongst others. At transfer station 865, a sheet transport apparatus, shown generally at 848, moves the sheet into contact with the photoconductive belt. The sheet transport apparatus has a pair of spaced belts 854 entrained about a pair of substantially cylindrical rollers 850 and 852.

A sheet gripper (not shown) extends between belts 854 and moves in unison therewith. A sheet is advanced from a stack of sheets 856 disposed on a tray. A friction retard feeder 858 advances the uppermost sheet from stack 856 onto a pre-transfer transport 860 which advances the sheet (not shown) to sheet transport 48. The sheet is advanced by transport 860 in synchronism with the movement of the sheet gripper. The sheet gripper then closes securing the sheet thereto for movement therewith in a re-circulating path. The leading edge of the sheet (not shown) is secured releasably by the sheet gripper. As belts 854 move in the direction of arrow 862, the sheet moves into contact with the photoconductive belt, in synchronism with the toner image developed thereon. In transfer zone 864, a corona generating device 866 sprays ions onto the backside of the sheet so as to charge the sheet to the proper magnitude and polarity for attracting the toner image from the photoconductive belt thereto. The sheet remains secured to the sheet gripper so as to move in a re-circulating path for three cycles. In this way, three or four different color toner images are transferred to the sheet in superimposed registration with one another. One skilled in the art will appreciate that the sheet may move in a re-circulating path for four cycles when under color black removal is used.

Each of the electrostatic latent images recorded on the photoconductive surface is developed with the appropriately colored toner and transferred, in superimposed registration with one another, to the sheet to form the multicolored copy of the colored original document.

After the last transfer operation, the sheet transport system directs the sheet to vacuum conveyor 868 which transports the sheet in the direction of arrow 870, to a fusing station 871, where the transferred toner image is permanently fused to the sheet. Thereafter, the sheet is advanced by a pair of rolls 876 to a catch tray 878 for subsequent removal therefrom by the machine operator.

The final processing station in the direction of movement of the photoconductive belt in the direction of arrow 822, is a photoreceptor cleaning apparatus, shown generally at 873. A rotatably mounted fibrous brush 872 may be positioned in the cleaning station and maintained in contact with the photoconductive belt to remove residual toner particles remaining after the transfer operation. Thereafter, lamp 882 illuminates the photoconductive surface to remove any residual charge remaining thereon prior to the start of the next successive cycle. As previously mentioned, other xerographic and non-xerographic printer hardware implementations may be used with the present method.

The present invention has been described herein as being used in conjunction with a laser printer. However, it is to be understood that it is possible for the present invention to be adapted for use in conjunction with other types of electrophotographic imaging apparatuses, such as a copy machine. Also, the implementation described herein for minimizing visual artifacts resulting from laser scan process directional positional errors may be utilized in a scanning application to compensate for bowed scanning information that results from less than perfect optics. The compensated information results in non-bowed output information, which compensates for the optical aberrations that may be present in an optical scanner.

It should also be understood that the teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof may be readily implemented as software executed on a programmed general purpose computer, a special purpose computer, a microprocessor, or the like. In this case, the methods hereof can be implemented as a routine embedded on a personal computer or as a resource residing on a server or workstation, such as a routine embedded in a plug-in, a printer, a photocopier, a driver, a scanner, a photographic system, a xerographic device, or the like. The methods provided herein can also be implemented by physical incorporation into an image processing, image reproduction, or color management system.

One or more aspects of the methods described herein are intended to be incorporated in an article of manufacture, including one or more computer program products, having computer usable or machine readable media. For purposes hereof, a computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. Furthermore, the article of manufacture may be included on at least one storage device readable by a machine architecture or other xerographic or image processing system embodying executable program instructions capable of performing the methodology described herein. Additionally, the article of manufacture may be included as part of a xerographic system, an operating system, a plug-in, or may be shipped, sold, leased, or otherwise provided separately either alone or as part of an add-on, update, upgrade, or product suite.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention.

What is claimed is:

1. A method for minimizing visual artifacts generated from laser scan process directional errors in an image reproduction device, the method comprising:

scanning an image having a plurality of halftone cells arranged in a brick-layer structure;

determining an error profile applicable to said scanned image;

based on said error profile, determining a start pixel location along a start border of a first halftone cell;

defining a first line pattern traversing through said first halftone cell in a process direction, said first line pattern beginning at said start pixel location and defining a first number of steps in a first direction towards a center of said first halftone cell and defining a second number of steps in a second direction towards an end pixel location at an end border of said first halftone cell opposite to said start pixel location at said start border, such that said first number of steps in said first direction equals said second number of steps in said second direction, each step in said first line pattern defining a start location of a pixel shift operation to correct said error; and for each scanline of said first halftone cell, shifting a pixel segment along said scanline in a direction defined by said error profile starting from said first line pattern.

2. The method of claim 1, further comprising adjusting said start pixel location to a location between a pixel at an adjacent border of said first halftone cell and a pixel at a center of said first halftone cell.

3. The method of claim 1, further comprising:

based on said error profile, determining a second pixel start location along a start border of a second halftone cell, said second halftone cell being in a fast scan direction along a scanline to said first halftone cell;

defining a second line pattern starting at said second pixel start location and traversing through said second halftone cell; and for each scanline between said first and second halftone cells, shifting a pixel segment along each scanline in a direction defined by said error profile starting from said first line pattern and ending at said second line pattern.

4. The method of claim 1, further comprising filling each pixel space generated as a result of said segment shifting with a pixel lost as a result of said shifting such that a cell density of said first halftone cell remains substantially constant.

5. The method of claim 1, further comprising buffering pixels in said first halftone cell lost during said shifting such that information about each of said lost pixels in said first halftone cell is preserved during said shifting.

6. The method of claim 1, further comprising:
extending said first line pattern through successive halftone cells in said brick-layer structure in said process direction; and
successively shifting pixel segments along scanlines starting from said first line pattern.

7. The method of claim 1, further comprising:
measuring at least one of a ROS skew and laserbeam bow error for said image reproduction device; and
generating said error profile from said measured error.

8. The method of claim 1, wherein each halftone cell in said brick layer structure comprises a plurality of pixels arranged in a M×N rectangle where M≧3 and N≧3.

9. A system for minimizing visual artifacts generated from laser scan process directional errors in an image reproduction device, the system comprising:
a storage medium capable of storing data; and
a processor in communication with said storage medium, said processor capable of executing a machine readable instruction for performing:
scanning an image having a plurality of halftone cells arranged in a brick-layer structure;
determining an error profile applicable to said scanned image;
based on said error profile, determining a start pixel location along a start border of a first halftone cell;
defining a first line pattern traversing through said first halftone cell in a process direction, said first line pattern beginning at said start pixel location and defining a first number of steps in a first direction towards a center of said first halftone cell and defining a second number of steps in a second direction towards an end pixel location at an end border of said first halftone cell opposite to said start pixel location at said start border, such that said first number of steps in said first direction equals said second number of steps in said second direction, each step in said first line pattern defining a start location of a pixel shift operation to correct said error; and
for each scanline of said first halftone cell, shifting a pixel segment along said scanline in a direction defined by said error profile starting from said first line pattern.

10. The system of claim 9, further comprising adjusting said start pixel location to a location between a pixel at an adjacent border of said first halftone cell and a pixel at a center of said first halftone cell.

11. The system of claim 9, further comprising:
based on said error profile, determining a second pixel start location along a start border of a second halftone cell, said second halftone cell being in a fast scan direction along a scanline to said first halftone cell;
defining a second line pattern starting at said second pixel start location and traversing through said second halftone cell; and
for each scanline between said first and second halftone cells, shifting a pixel segment along each scanline in a direction defined by said error profile starting from said first line pattern and ending at said second line pattern.

12. The system of claim 9, further comprising filling each pixel space generated as a result of said segment shifting with a pixel lost as a result of said shifting such that a cell density of said first halftone cell remains substantially constant.

13. The system of claim 12, further comprising buffering pixels in said first halftone cell lost during said segment shifting such that information about each of said lost pixels in said first halftone cell is preserved during said shifting.

14. The system of claim 9, further comprising:
extending said first line pattern through successive halftone cells in said brick-layer structure in said process direction; and
successively shifting pixel segments along scanlines through each of said successive halftone cells starting from said first line pattern.

15. The system of claim 9, further comprising:
measuring at least one of a ROS skew and laserbeam bow error for said image reproduction device; and
generating said error profile from said measured error.

16. A computer program product for minimizing visual artifacts generated from laser scan process directional errors in an image reproduction device, the computer program product comprising:
a non-transitory computer readable medium storing instructions that, when executed on a computer, cause the computer to perform a method comprising:
scanning an image having a plurality of halftone cells arranged in a brick-layer structure;
determining an error profile applicable to said scanned image;
based on said error profile, determining a start pixel location along a start border of a first halftone cell;
defining a first line pattern traversing through said first halftone cell in a process direction, said first line pattern beginning at said start pixel location and defining a first number of steps in a first direction towards a center of said first halftone cell and defining a second number of steps in a second direction towards an end pixel location at an end border of said first halftone cell opposite to said start pixel location at said start border, such that said first number of steps in said first direction equals said second number of steps in said second direction, each step in said first line pattern defining a start location of a pixel shift operation to correct said error; and
for each scanline of said first halftone cell, shifting a pixel segment along said scanline in a direction defined by said error profile starting from said first line pattern.

17. The computer program product of claim 16, further comprising adjusting said start pixel location to a location between a pixel at an adjacent border of said first halftone cell and a pixel at a center of said first halftone cell.

18. The computer program product of claim 16, further comprising:
based on said error profile, determining a second pixel start location along a start border of a second halftone cell, said second halftone cell being in a fast scan direction along a scanline to said first halftone cell;
defining a second line pattern starting at said second pixel start location and traversing through said second halftone cell; and
for each scanline between said first and second halftone cells, shifting a pixel segment along each scanline in a direction defined by said error profile starting from said first line pattern and ending at said second line pattern.

19. The computer program product of claim 16, further comprising filling each pixel space generated as a result of said segment shifting with a pixel lost as a result of said shifting such that a cell density of said first halftone cell remains substantially constant.

20. The computer program product of claim 16, further comprising:

extending said first line pattern through successive halftone cells in said brick-layer structure in said process direction; and successively shifting pixel segments along scanlines through each of said successive halftone cells starting from said first line pattern.

* * * * *